May 19, 1970 HIROSHI SUGAYA ET AL 3,512,694

MAGNETIC RECORDING AND REPRODUCING APPARATUS

Filed June 26, 1968 3 Sheets-Sheet 1

MAGNETIC RECORDING AND REPRODUCING APPARATUS

Filed June 26, 1968 3 Sheets-Sheet 2

United States Patent Office 3,512,694
Patented May 19, 1970

3,512,694

MAGNETIC RECORDING AND REPRODUCING APPARATUS

Hiroshi Sugaya, Suita-shi, Masaaki Notani, Osaka, and Hideki Sakumoto, Moriguchi-shi, Japan, assignors to Matsushita Electric Industrial Co., Ltd.

Filed June 26, 1968, Ser. No. 740,370
Claims priority, application Japan, June 27, 1967, 42/42,013
Int. Cl. G11b 15/62
U.S. Cl. 226—91 8 Claims

ABSTRACT OF THE DISCLOSURE

A magnetic recording and reproducing apparatus of the type in which a magnetic tape runs along a tape guide having therein a rotary head. In the apparatus, guide posts on opposite sides of the tape guide are movably arranged so that the traveling path of the tape during the tape loading and unloading, fast forwarding and rewinding differs from that during the recording and reproduction, thus simplifying the tape loading and unloading operation and obviating any damage to the tape and the head by moving the tape away from the head in the operation other than the recording and reproducing operation.

Figure 1:
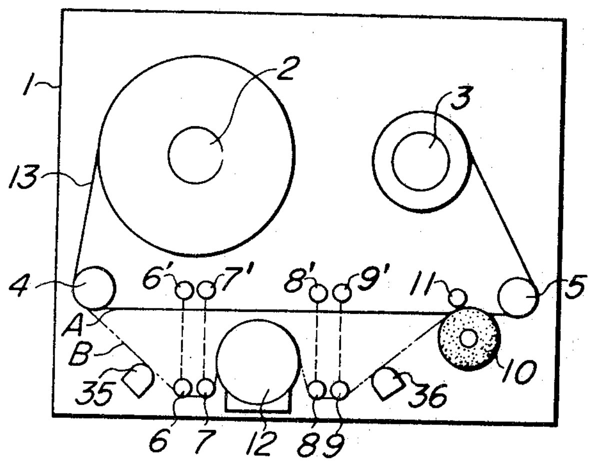

This invention relates to magnetic recording and reproducing apparatus, and more particularly to a magnetic recording and reproducing apparatus of the kind in which a plurality of guide posts are disposed on opposite sides of a cylindrical tape guide for training a controlled length of a magnetic tape around the tape guide.

Conventional magnetic recording and reproducing apparatus of the two rotary head type have such a general construction that a plurality of guide posts are fixedly disposed adjacent to positions at which a magnetic tape starts to engage and than leaves a cylindrical tape guide equipped therein with the rotary heads so as to ensure stable running of the magnetic tape around the tape guide along an arcuate path having a subtending angle of more than 180°. When, in such an apparatus, a new magnetic tape is to be placed in its recording or reproducing position, the magnetic tape must be unwound from the supply reel at its leading end portion over a length of several feet and guided by hand along a complex tortuous path so as to engage all of the elements including the guide posts, erase head, rotary head and audio head, and then the leading end of the magnetic tape must be fixed to a take-up reel. Thus, the manipulation involved therein has been quite troublesome and time-consuming. Furthermore, the conventional apparatus has involved a great inconvenience in that it can not properly operate if the magnetic tape is guided along an erroneous path.

Moreover, the surface of the magnetic coating on the magnetic tape is inevitably touched by fingers because the magnetic tape is manually handled for the loading of the magnetic tape in its operative position and unloading of the tape from the operative position, resulting in adhesion of dust, sweat and fatty matters to the surface of the magnetic coating on the magnetic tape. The adhesion of such harmful matters to the magnetic tape is quite objectionable because transfer of the harmful matters to the magnetic heads gives rise to an undesirable reduction in the output of the head and scratches produced on the surface of the magnetic coating by the harmful matters give rise to an undesirable generation of noises during reproduction.

The conventional magnetic recording and reproducing apparatus of the kind described has further been defective in that an increased tape tension is required for the fast forwarding and rewinding of the magnetic tape, resulting in the requirement of a high drive torque, since the path of the magnetic tape in its stopped state as well as the traveling path during the fast forwarding and rewinding operation is the same as that followed by the magnetic tape during the recording and reproducing operation. Another defect encountered with the conventional magnetic recording and reproducing apparatus of the kind described has been the short service life of the magnetic tape and the magnetic heads due to the fact that the magnetic tape is kept in continual contact with the magnetic heads in its stopped state as well as during the fast forwarding and rewinding operation as pointed out here above.

With a view to eliminate these and other defects involved in the conventional magnetic recording and reproducing apparatus of the kind described above, the present invention contemplates the provision of a novel and improved magnetic recording and reproducing apparatus of the rotary head type which is equipped with means by which tape guide posts disposed on opposite sides of a tape guide can be moved between a retracted and an advanced position as required so as to change the path of a magnetic tape during its replacement as well as the traveling path during its fast forwarding and rewinding operation from the traveling path of the magnetic tape during its recording and reproducing operation. By virtue of the provision of the above-described means, the traveling path of the magnetic tape can easily be changed; the guide posts moving from the retracted position to the advanced position can be guided without any contact with the rotary heads so as to train the necessary length of the magnetic tape around the tape guide; and the regulation of the position of the guide posts during the recording and reproduction can accurately be effected.

It is a primary object of the present invention to provide a magnetic recording and reproducing apparatus of the kind having a cylindrical tape guide equipped with at least one rotary head therein, and a plurality of guide posts disposed on opposite sides of said tape guide so as to train the necessary length of a magnetic tape around said tape guide in a Ω-like form and ensure the stable travel of the magnetic tape past said tape guide, which apparatus comprises means for moving said guide posts between an advanced position and a retracted position relative to said tape guide thereby facilitating the tape loading and unloading operation and isolating the magnetic tape from unnecessary contact with said tape guide and magnetic heads including said rotary head when such contact is not required, thus minimizing damage that may be imparted to said magnetic tape and said magnetic heads.

Figure 4:
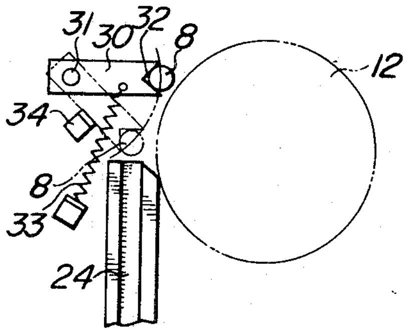
Figure 2A:
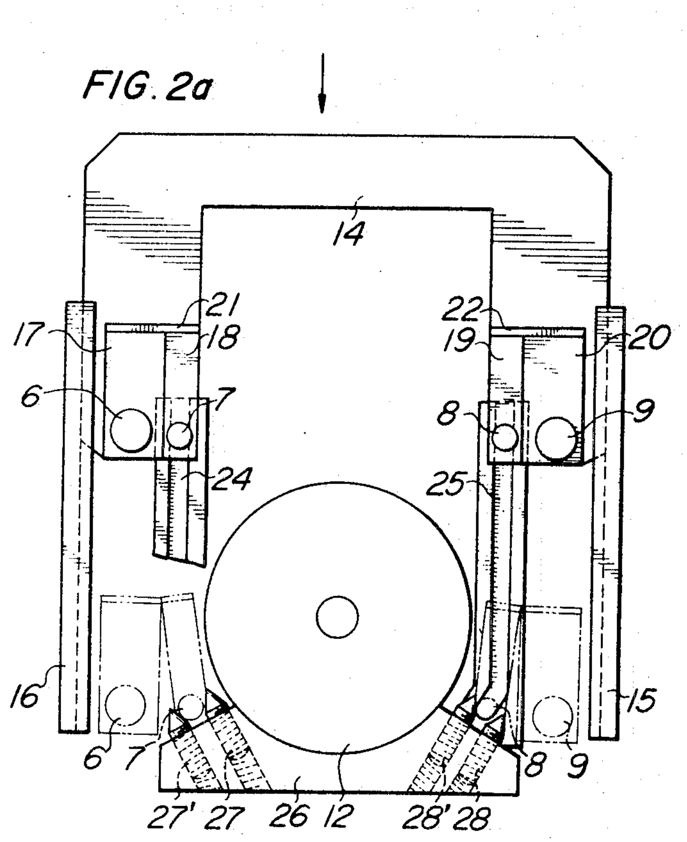
Figure 2B:
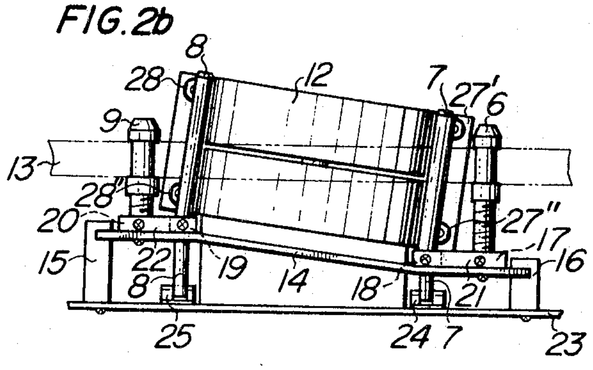
Figure 3A:
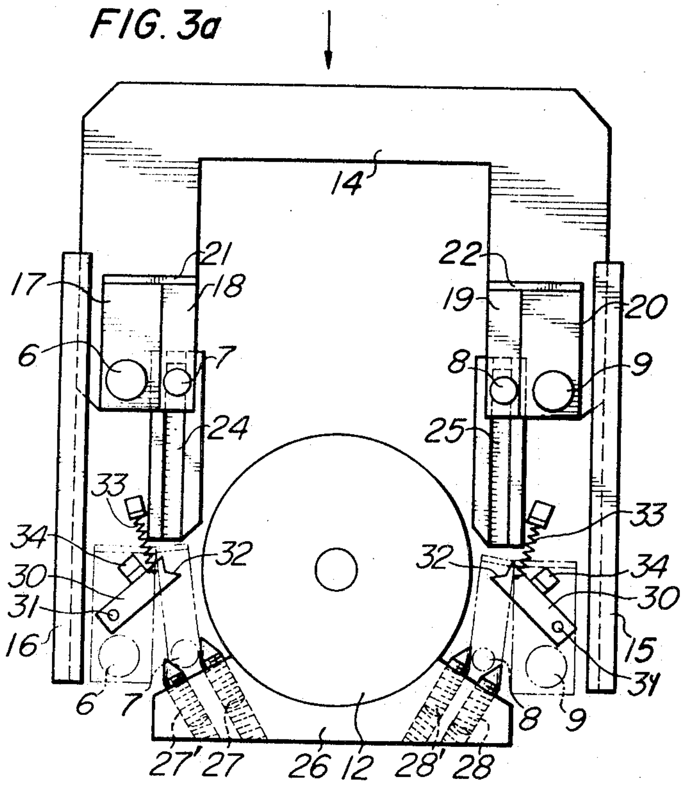
Figure 3B:
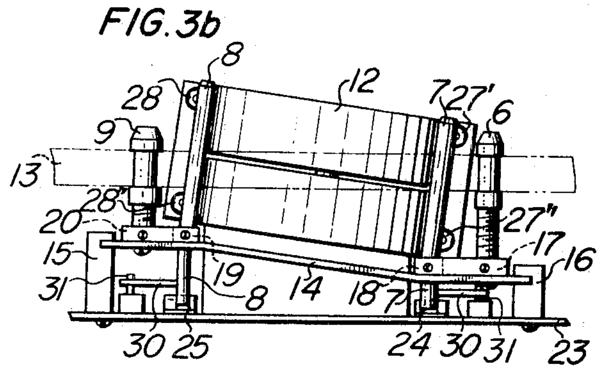

Other objects and advantages will become apparent from the following description taken in conjunction with the accompanying drawings, in which:

FIG. 1 is a schematic plan view of the magnetic recording and reproducing apparatus of the rotary head type according to the present invention;

FIG. 2*a* is a plan view showing principal parts of an embodiment of the apparatus according to the present invention;

FIG. 2*b* is a rear elevational view of the embodiment shown in FIG. 2*a*, the view being taken in the direction of the arrow in FIG. 2*a*;

FIG. 3*a* is a plan view showing principal parts of another embodiment of the apparatus according to the present invention;

FIG. 3*b* is a rear elevational view of the embodiment shown in FIG. 3*a*, the view being taken in the direction of the arrow in FIG. 3*a*; and FIG. 4 is a plan view showing the detail of a part of the embodiment shown in FIG. 3*a*.

Referring first to FIG. 1, the structure of the magnetic recording and reproducing apparatus according to the present invention will briefly be described. The apparatus comprises a deck plate 1 which is commonly called a tape transport panel, a reel table 2 for mounting thereon a tape supply reel, a reel table 3 for mounting thereon a take-up reel, and guide posts 4, 5, 6, 7, 8 and 9 for guiding a magnetic tape 13 along a predetermined path. In accordance with the present invention, the guide posts 4 and 5 are fixed to the deck plate 1, but the guide posts 6, 7, 8 and 9 are movable to their retracted position shown by 6', 7', 8' and 9', respectively. A pinch roller 10 and a capstan 11 cooperate to drive the magnetic tape 13. A cylindrical tape guide 12 is provided internally with at least one rotary head.

In the replacement, fast forwarding and rewinding of the magnetic tape, the guide posts 6, 7, 8 and 9 disposed adjacent to the entrance and the exit of the magnetic tape 13 to and from the tape guide 12 are moved to their retracted position shown by 6', 7', 8' and 9' so that the magnetic tape 13 follows a path A as seen in FIG. 1. In such a state, the magnetic tape 13 can freely travel without contacting the tape guide 12, an erase head 35, an audio and control signal head 36 and the unnecessary guide posts 6, 7, 8 and 9.

On the other hand, during the recording and reproduction, the magnetic tape 13 supplied from the tape supply reel is fed past the stationary guide post 4 to contact the erase head 35 and is then guided past the guide posts 6 and 7 to pass around a substantial portion of the outer periphery of the tape guide 12. The magnetic tape 13 leaving the tape guide 12 is then guided by the guide posts 8 and 9 to contact the audio and control signal head 36 and is then fed past the tape drive section consisting of the capstan 11 and the pinch roller 10 to be finally taken up on the take-up reel by being guided by the stationary guide post 5. In this case, the movable guide posts 6, 7, 8 and 9 must be urged to their advanced position shown by 6, 7, 8 and 9 from their retracted position shown by 6', 7', 8' and 9' so that the necessary length of the magnetic tape 13 can continuously be trained around the tape guide 12 during the traveling movement of the magnetic tape 13 from the supply reel to the take-up reel.

Suppose, for example, that the tape guide 12 is equipped therein with two rotary heads. Then, it is necessary that the magentic tape 13 be trained around the tape guide 12 over an arc of more than 180°. To this end, the spacing between the inner guide posts 7 and 8 disposed on the opposite sides of the tape guide 12 must be smaller than the diameter of the tape guide 12. However, the guide posts 7 and 8, the spacing between which is smaller than the diameter of the tape guide 12, cannot be moved forwardly from the position they take in the replacing, fast forwarding and rewinding operation, that is, their retracted position shown by 7' and 8'. In other words, some means need be provided to change the spacing between these guide posts 7 and 8 when they move to their advanced position while passing on the opposite sides of the tape guide 12.

One form of the means for effecting the change in the spacing between the guide posts 7 and 8 is illustrated in FIGS. 2*a* and 2*b*. The tap guide 12 is mounted on a support base 26. A pair of rails 15 and 16 are parallelly disposed on opposite sides of the tape guide 12 and movably hold therebetween a generally U-like movable plate or slider 14 so that the slider 14 can move toward and away from the tape guide 12 by being regulated in its movement by the rails 15 and 16. The movable guide posts 6, 7, 8 and 9 are mounted on respective guide post mounting members 17, 18, 19 and 20 which are disposed on the upper face of the slider 14. Of these guide post mounting members, the guide post mounting members 17 and 20 which are remote from the tape guide 12 are securely fixed to the slider 14, while the guide post mounting members 18 and 19 which are nearer to the tape guide 12 are laterally movably connected to the guide post mounting members 17 and 20 by means of leaf springs 21 and 22, respectively. The guide posts 7 and 8 carried by the respective guide post mounting members 18 and 19 extend downward through these mounting members 18 and 19 and through the slider 14 as seen in FIG. 2*b* to be to be received at their lower ends in respective guide channels 24 and 25 disposed on a base plate 23 (or the tape transport panel 1 in FIG. 1).

The spacing between the guide channels 24 and 25 which extend forward beyond the transverse center line of the tape guide 12 is such that the spacing between the movable guide posts 7 and 8 guided thereby is greater than the diameter of the tape guide 12 on the rear side of the tape guide 12 and becomes successively smaller than the diameter of the tape guide 12 as these guide posts move past the transverse center line of the tape guide 12 toward their advanced position on the forward side of the tape guide 12. When, therefore, the slider 14 is advanced in the direction of the arrow from its retracted position shown in FIG. 2*a*, the movable guide posts 6, 7, 8 and 9 are successively advanced together with the slider 14. The spacing between the guide posts 7 and 8 is greater than the diameter of the tape guide 12 until the guide posts 6, 7, 8 and 9 move past the transverse center line of the tape guide 12, and thus the guide posts 7 and 8 can be guided without any contact with the tape guide 12 and the rotary head disposed within the tape guide 12. After the guide posts 6, 7, 8 and 9 move past the transverse center line of the tape guide 12, the guide posts 7 and 8 nearer to the tape guide 12 are gradually urged toward each other along the guide channels 24 and 25 so that the spacing between the guide posts 7 and 8 is gradually reduced while these guide posts 7 and 8 being kept away from contact with the tape guide 12. The above movement of the guide posts 7 and 8 toward each other is assisted by the hinge action of the leaf springs 21 and 22 hingedly connecting the guide post mounting members 18 and 19 to the respective guide post mounting members 17 and 20.

When the guide posts 7 and 8 have moved to their advanced position at which the necessary length of the magnetic tape 13 is trained around a substantial portion of the outer periphery of the tape guide 12, the guide posts 7 and 8 are engaged by tapered end portions of taper-ended screws 27, 27', 27'', 27''' and 28, 28', 28'', 28''', respectively, which are fitted in the tape guide support base 26 so as to ensure the accurate positioning of the guide posts 7 and 8 in their advanced position. The position of the guide posts 7 and 8 can suitably be adjusted by adjusting the extent of projection of the taper-ended screws 27, 27', 27'', 27''' and 28, 28', 28'', 28''' from the tape guide support base 26, and hence the length of the magnetic tape 13 to be trained around the substantial portion of the outer periphery of the tape guide 12 can easily be regulated as required.

Another form of the means for effecting the change in the spacing between the guide posts 7 and 8 is illustrated in FIGS. 3*a*, 3*b* and 4. This embodiment differs from the previous embodiment in the manner of movement of the guide posts 7 and 8 toward the tape guide 12. The tape guide 12 provided therein with at least one rotary head is mounted on a support base 26. Taper-ended screws 27, 27', 27'', 27''' and 28, 28', 28'', 28''' for regulating the position of the guide posts 7 and 8 are fitted in the tape guide support base 26. A pair of rails 15 and 16 are parallelly disposed on opposite sides of the tape guide 12 and movably hold therebetween a generally U-like movable plate or slider 14 so that the slider 14 can move toward and away from the tape guide 12 by being regulated in its movement by the rails 15 and 16. The movable guide posts 6, 7, 8 and 9 are mounted on respective guide post mounting members 17, 18, 19 and 20 which are disposed on the upper face of the slider 14. Of these guide post mounting members, the guide post mounting members 17 and 20 which are remote from the tape guide 12 are securely fixed to the slider 14, while the guide post mounting members 18 and 19 which are nearer to the tape guide 12 are laterally movably connected to the guide post mounting members 17 and 20 by means of leaf springs 21 and 22, respectively. The guide posts 7 and 8 carried by the respective guide post mounting members 18 and 19 extend downwardly through these mounting members 18 and 19 and through the slider 14 to be received at their lower ends in respective guide channels 24 and 25 provided on a base plate 23 (or the tape transport panel 1 in FIG. 1) as seen in FIG. 3*b*. The structure of the present embodiment described so far is substantially identical with that of the previous embodiment described with reference to FIGS. 2*a* and 2*b*.

The spacing between the guide channels 24 and 25 is such that the spacing between the movable guide posts 7 and 8 guided thereby is greater than the diameter of the tape guide 12, and the guide channels 24 and 25 terminate in a position slightly rearward of the transverse center line of the tape guide 12. A pivotal arm 30 is pivotally mounted at one end thereof on the base plate 23 (tape transport panel) by means of a pin 31 and is provided at the other or free end thereof with a cutout 32 which is engageable with the downward projecting portion of the guide post 8 carried by the guide post mounting member 18. The pivotal arm 30 is normally urged by a spring 33 to abut a stopper 34 which restricts further rotation of the pivotal arm 30, and in such a position, the cutout 32 of the pivotal arm 30 comes adjacent to the front end of the guide channel 24 as shown by the one-dot chain line in FIG. 4. A pivotal arm 30 of similar construction but pivotal in a direction opposite to the above-described direction is disposed adjacent to the front end of the guide channel 25 in order to drive the guide post 7. When, therefore, the slider 14 is advanced in the direction of the arrow from its retracted position shown in FIG. 3*a*, the movable guide posts 6, 7, 8 and 9 are successively advanced together with the slider 14. The spacing between the guide posts 7 and 8 is greater than the diameter of the tape guide 12 until the guide posts 6, 7, 8 and 9 move past the transverse center line of the tape guide 12, and thus the guide posts 7 and 8 can be guided without any contact with the tape guide 12 and the rotary head disposed within the tape guide 12. At the point at which the guide posts 6, 7, 8 and 9 move past the transverse center line of the tape guide 12, that is, at the point at which the guide channels 24 and 25 terminate, the downwardly projecting portions of the guide posts 7 and 8 nearer to the tape guide 12 are engaged by the cutouts 32 of the pivotal arms 30. The slider 14 moves further forwardly together with the guide posts 7 and 8 which are thus engaged by the cutouts 32 of the pivotal arms 30. As a result, the guide posts 7 and 8 are each urged to move on the partial circle which is drawn by the free end of the pivotal arm 30 about the pin 31. Thus, the guide posts 7 and 8 are gradually urged toward each other by the pivotal movement of the pivotal arms 30 so that the spacing between the guide posts 7 and 8 is gradually reduced while these guide posts 7 and 8 are being kept away from contact with the tape guide 12. The above movement of the guide posts 7 and 8 toward each other is assisted by the hinge action of the leaf springs 21 and 22 hingedly connecting the guide post mounting members 18 and 19 to the respective guide post mounting members 17 and 20.

When the guide posts 7 and 8 have moved to their advanced position at which the necessary length of the magnetic tape 13 is trained around a substantial portion of the outer periphery of the tape guide 12, the guide posts 7 and 8 are engaged by the tapered end portions of the taper-ended screws 27, 27′, 27″, 27‴ and 28, 28′, 28″, 28‴, respectively, which are fitted in the tape guide support base 26 so as to ensure the accurate positioning of the guide posts 7 and 8 in their advanced position. The position of the guide posts 7 and 8 can suitably be adjusted by adjusting the extent of projection of the taper-ended screws 27, 27′, 27″, 27‴ and 28, 28′, 28″, 28‴ from the tape guide support base 26, and hence the length of the magnetic tape 13 to be trained around the subtantial portion of the outer periphery of the tape guide 12 can easily be regulated as required.

In the above embodiments, both the guide posts 7 and 8 are arranged to move toward each other, that is, in the direction to train the magnetic tape 13 around the tape guide 12 after they move past the transverse center line of the tape guide 12. However, it will be understood that, in lieu of the above arrangement, one of these guide posts may solely be arranged to move in the magnetic-tape training direction.

From the foregoing description, it will be understood that the present invention provides a magnetic recording and reproducing apparatus which comprises a cylindrical tape guide equipped internally with at least one rotary head, a slider movable toward and away from said tape guide on opposite sides of the latter, a pair of guide posts mounted on said slider for training a magnetic tape around a substantial portion of the outer periphery of said tape guide, means for guiding said guide posts between their retracted and advanced positions, said means being operative to guide said guide posts in spaced relation from said tape guide when said guide posts move past said tape guide on opposite sides thereof and to successively change the spacing between said guide posts after said guide posts have moved past the transverse center line of said tape guide, whereby to train easily the necessary length of the magnetic tape around said tape guide, and means for freely varying the position of said guide posts in their advanced position. The magnetic recording and reproducing apparatus having such a structure has the following advantages:

(1) Tape loading operation can be simplified because the troublesome manipulation of gripping the tape by hand and training it around the tape guide and other elements is eliminated.

(2) This facilitates the use of a magnetic tape of the cartridge type.

(3) In connection with the use of a magnetic tape of the cartridge type as described in (2), the surface of the magnetic coating on the tape is prevented from contact by fingers. This eliminates the objectionable adhesion of dust, sweat and fatty matters to the surface of the magnetic coating thereby lessening the damage to the tape and obviating the undesirable reduction in the output of the head.

(4) The service life of the tape and the magnetic heads can be extended since the tape does not contact the magnetic heads and unnecessary guide posts in the stopped state as well as during the fast forwarding and rewinding of the tape.

(5) In the case of the fast forwarding and rewinding of the tape described in (4), the tape can run along a simplified path with a resultant lower drive torque since the tape does not contact the magnetic heads and unnecessary guide posts.

(6) This enables to employ a drive motor of lower output and to reduce the overall size of the apparatus.

What is claimed is:

1. A magnetic recording and reproducing apparatus comprising a cylindrical tape guide equipped therein with at least one rotary head, a member movable toward and away from said tape guide on opposite sides of the tape guide, a pair of spaced guide posts movably mounted on said member for training a controlled length of a magnetic tape around a substantial portion of the outer periphery of said tape guide, and means for successively changing the spacing between said guide posts when said guide posts have moved past the transverse center line of said tape guide on opposite sides of the tape guide.

2. A magnetic recording and reproducing apparatus comprising a cylindrical tape guide equipped therein with at least one rotary head, a member movable toward and away from said tape guide on opposite sides of the tape guide, a pair of spaced guide posts movably mounted on said member for training a controlled length of a magnetic tape around a substantial portion of the outer periphery of said tape guide, and guide means provided on at least one side of said tape guide for slidably receiving therein one end of one of said guide posts, said guide means being so arranged as to successively change the spacing between said guide posts when said guide posts have moved past the transverse center line of said tape guide on opposite sides of the tape guide.

3. A magnetic recording and reproducing apparatus according to claim 2, in which said guide means slidably receive therein one end of mounting members mounting said guide posts on said member.

4. A magnetic recording and reproducing apparatus according to claim 2, in which a pair of said spaced guide posts are movably mounted on separate movable members respectively and movable separately.

5. A magnetic recording and reproducing apparatus comprising a cylindrical tape guide equipped thereinside with at least one rotary head, a member movable toward and away from said tape guide on opposite sides of the tape guide, a pair of spaced guide posts movably mounted on said member for training a controlled length of a magnetic tape around a substantial portion of the outer periphery of said tape guide, and guide means provided on at least one side of said tape guide including a pivotal arm pivotable about a point, said pivotal arm being engageable at its free end with one end of one of said guide posts so as to successively urge said one of the guide posts toward said tape guide when said guide posts have moved past the transverse center line of said tape guide on opposite sides of the tape guide.

6. A magnetic recording and reproducing apparatus according to claim 5, in which said pivotal arm is engageable at its free end with one end of mounting members mounting said guide posts on said member.

7. A magnetic recording and reproducing apparatus according to claim 5, in which a pair of said spaced guide posts are movably mounted on separate movable members respectively and movable separately.

8. A magnetic recording and reproducing apparatus comprising a cylindrical tape guide equipped therein with at least one rotary head, a member movable toward and away from said tape guide on opposite sides of the tape guide, a pair of spaced guide posts movably mounted on said member for training a controlled length of a magnetic tape around a substantial portion of the outer periphery of said tape guide, means for successively urging said guide posts toward said tape guide when said guide posts have moved past the transverse center line of said tape guide on opposite sides of the tape guide, and a plurality of taper-ended screws for regulating the stopping position of said guide posts.

References Cited

UNITED STATES PATENTS

| | | | |
|---|---|---|---|
| 2,675,973 | 4/1954 | Reed et al. | 226—183 |
| 2,678,820 | 5/1954 | Masterson | 226—91 X |

ALLEN N. KNOWLES, Primary Examiner

U.S. Cl. X.R.

226—183